United States Patent [19]

Nemes

[11] Patent Number: 4,996,663
[45] Date of Patent: Feb. 26, 1991

[54] METHODS AND APPARATUS FOR DECONTAMINATING HASH TABLES

[75] Inventor: Richard M. Nemes, Brooklyn, N.Y.
[73] Assignee: Bell Communications Research, Inc., Livingston, N.J.
[21] Appl. No.: 151,638
[22] Filed: Feb. 2, 1988
[51] Int. Cl.$^5$ .............................................. G06F 12/00
[52] U.S. Cl. ............................... 364/900; 364/962.1; 364/963.3; 364/967.5; 364/974.5
[58] Field of Search ... 364/200 MS File, 900 MS File

[56] References Cited

U.S. PATENT DOCUMENTS

| | | | |
|---|---|---|---|
| 4,121,286 | 10/1978 | Venton et al. | 364/900 X |
| 4,215,402 | 7/1980 | Mitchell et al. | 364/200 |
| 4,447,875 | 5/1984 | Bolton et al. | 364/200 |
| 4,502,118 | 2/1985 | Hagenmaier, Jr. et al. | 364/200 |
| 4,716,524 | 12/1987 | Oxley et al. | 364/200 |
| 4,775,932 | 10/1988 | Oxley et al. | 364/200 |

OTHER PUBLICATIONS

"Data Structures with Abstract Data Types and Pascal," D. F. Stubbs and N. W. Webre, Brooks/Cole Publishing Company, 1985, Section 7-4, Hashed Implementations, pp. 310-336.
"Hints for Computer System Design," Butler W. Lampson, IEEE Software, Jan. 1984, p. 23.
"Grapevine, An Exercise in Distributed Computing," Birrell et al., Communications of the ACM, vol. 25, No. 4, Apr. 1982, pp. 260-274.
"Walnut & Storing Electronic Mail in a Database," Donahue et al., Palo Alto Research Center, Nov. 1985, pp. 1-20.
"The Art of Computer Programming", Sorting and Searching, D. E. Knuth, Addison-Wesley Series in Computer Science and Information Processing, pp. 506-549, 1973.
"Data Structures and Program Design", R. L. Kruse, Prentice-Hall, Inc., 1984, Section 3.7, Hashing, pp. 112-126.

Primary Examiner—Gareth D. Shaw
Assistant Examiner—Paul Kulik
Attorney, Agent, or Firm—James W. Falk

[57] ABSTRACT

A method and apparatus for performing storage and retrieval in an information storage system is disclosed which uses the hashing technique. In order to prevent contamination of the storage medium by deleted records, a hybrid hashing technique is used which uses a fast, contaminating deletion of records during times of heavy load on the system, but uses a slow, non-contaminating deletion when the load on the system is not as heavy. The slow, non-contaminating deletion automatically removes previously generated contamination in the vicinity of the slow, non-contaminating deletion, thereby automatically decontaminating the storage space. Because no long term contamination can build up in the present system, it is useful for large data bases which are heavily used and which require the fast access provided by hashing.

6 Claims, 7 Drawing Sheets

INSERT

HYBRID DELETION

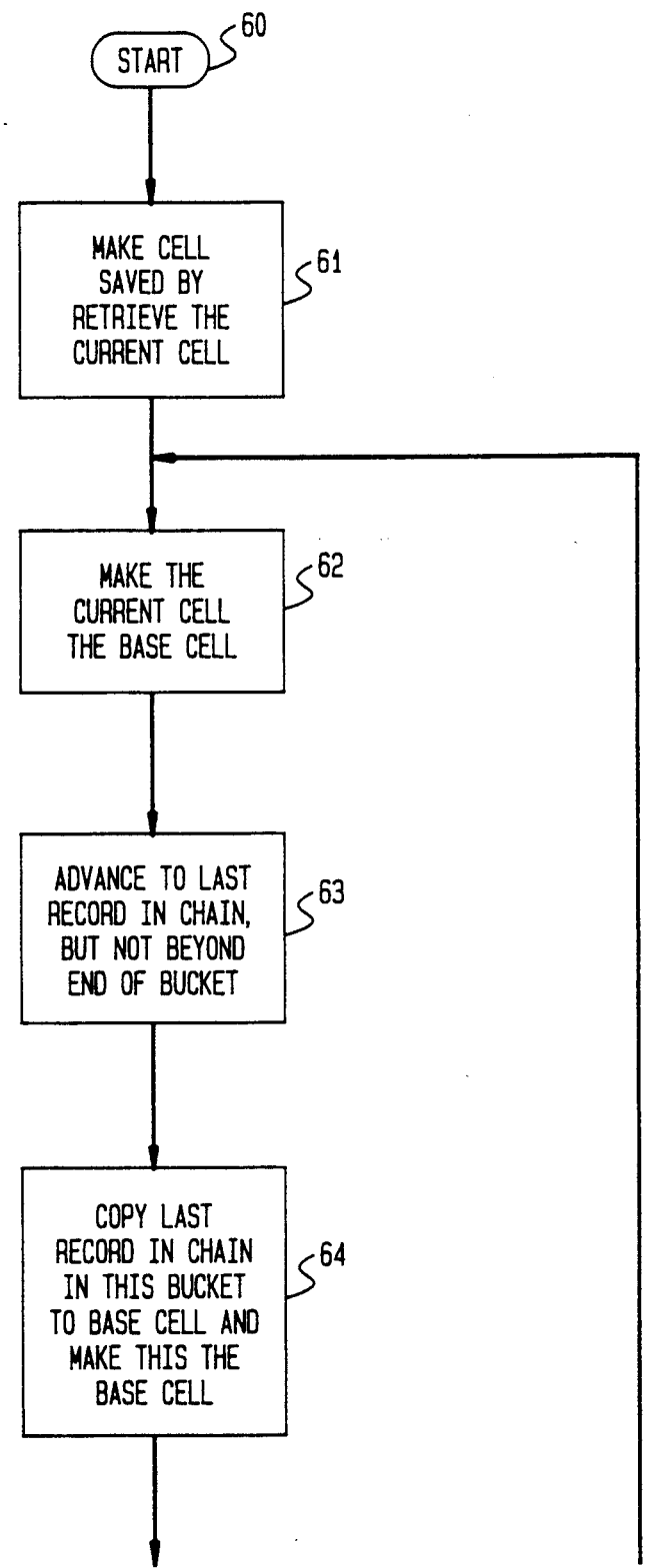

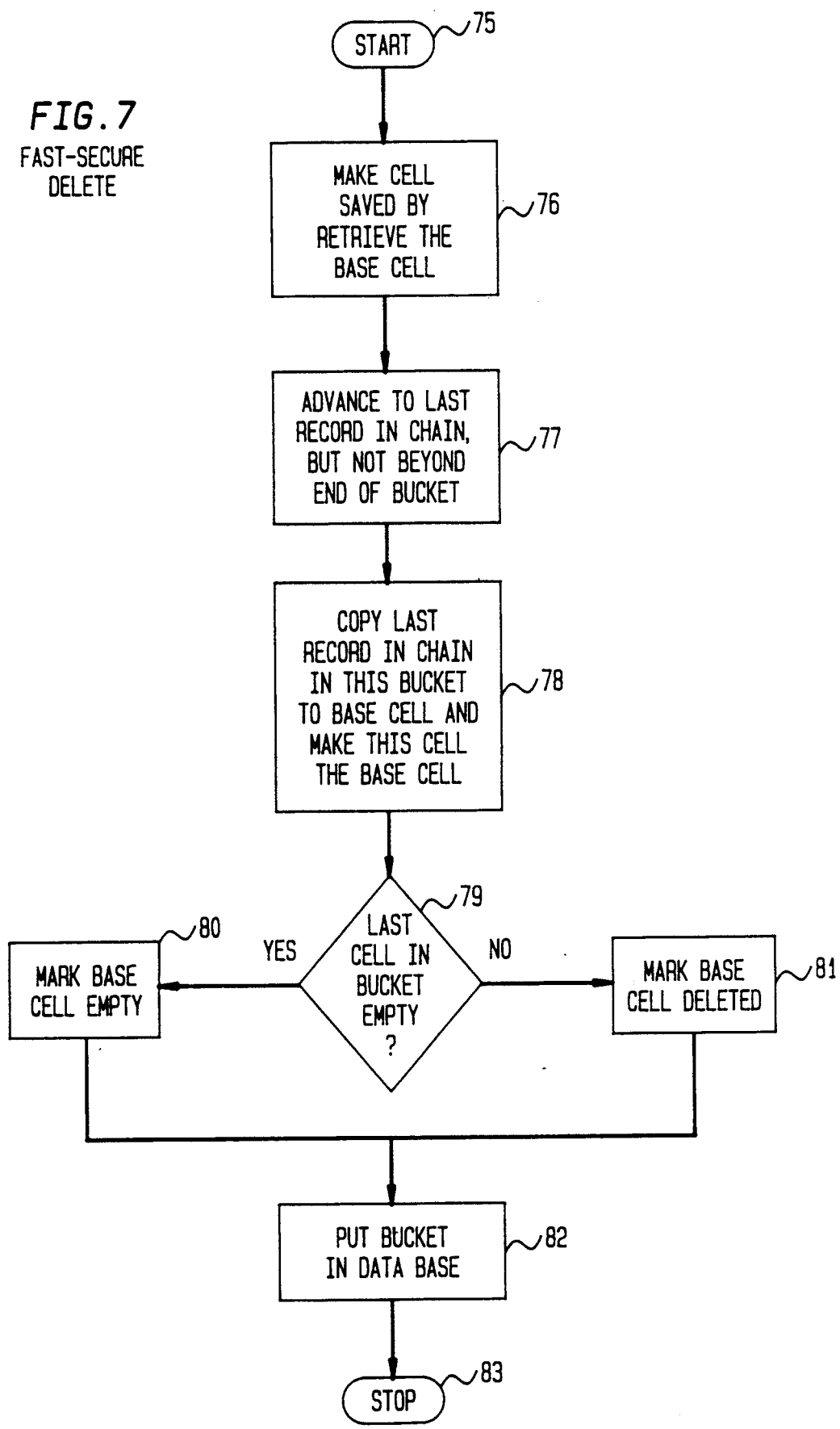

METHODS AND APPARATUS FOR DECONTAMINATING HASH TABLES

TECHNICAL FIELD

This invention relates to information storage and retrieval systems and, more particularly, to the use of hashing techniques in such systems.

BACKGROUND OF THE INVENTION

Information or data stored in a computercontrolled storage mechanism can be retrieved by searching for a particular key in the stored records. Records with a stored key matching the search key are then retrieved. Such searching techniques require repeated accesses or probes into the storage mechanism to perform the key comparisons. In large storage and retrieval systems, such searching, even if augmented by efficient search algorithms such as a binary search, often requires an excessive amount of time.

Another well-known and much faster method for storing and retrieving information from computer store involves the use of so-called "hashing" techniques. These techniques are also sometimes called scatter-storage or key-transformation techniques. In a system using hashing, the key is operated upon (by a hashing function) to produce a storage address in the storage space (called the hash table). This storage address is then used to access the desired storage location directly with fewer storage accesses or probes than sequential or binary searches. Hashing techniques are described in the classic text by D. Knuth entitled *The Art of Computer Programming, Volume 3, Sorting and Searching*, pp.506-549, Addison-Wesley, Reading, Massachusetts, 1973.

Hashing functions are designed to translate the universe of keys into addresses uniformly distributed throughout the hash table. Typical hashing operations include truncation, folding, transposition and modulo arithmetic. A disadvantage of hashing techniques is that more than one key can translate into the same storage address, causing "collisions" in storage or retrieval operations. Some form of collision-resolution strategy (sometimes called "rehashing") must therefore be provided. For example, the simple strategy of searching forward from the initial storage address to the desired storage location will resolve the collision. This latter technique is called linear probing. If the hash table is of the table map back to the beginning of the table, then the linear probing is done with "open addressing," i.e., with the entire hash table as overflow space in the event that a collision occurs.

Removing or deleting records from a hash table can also be a complicated procedure. The location of a record to be deleted cannot be simply emptied since this location may be a link in a chain of locations previously created during a collision-resolution procedure. The typical solution to this problem is to mark the record as "deleted" rather than as "empty." In time, however, the storage space can become contaminated by an excessive number of deleted storage locations that must be searched to locate desired records. With the passage of time, such storage contamination can reduce the performance of retrieval operations below acceptable levels. These problems are discussed in considerable detail in *Data Structures and Program Design*, by R. L. Kruse, Prentice-Hall, Englewood Cliffs, N.J., 1984, pp. 112-126, and *Data Structures with Abstract Data Types and PASCAL*, by D. F. Stubbs and N. W. Webre, Brooks/Cole Publishing, Monterey, California, 1985, pp. 310-336.

In the prior art, such storage space contamination was avoided by deletion procedures that eliminated deleted records by replacing the deleted record with another record in the collision-resolution chain of records and thus close the chain without leaving any deleted records. One such procedure is shown in the aforementioned text by Knuth at page 527. Unfortunately, such non-contaminating procedures, due to the necessity for successive probes into the storage space, take so much time that they can be used only in systems having very low fill factors. The fill factor, in this sense, is the amount of storage space which is full.

The problem, then, is to provide the speed of access of hashing techniques for large and heavily used information storage systems and, at the same time, prevent the large-scale contamination which normally results from deletions in such large and heavily used systems.

SUMMARY OF THE INVENTION

In accordance with the illustrative embodiment of the invention, these and other problems are overcome by using a hybrid hashing technique. In particular, during normal times when the load on the storage system is not excessive, a non-contaminating but slow deletion of records is used. This slow, non-contaminating deletion involves closing the collision-resolution chain of locations by moving a record from a later position in the chain into the position of the record to be deleted. This leaves no deleted record locations in the storage space to slow down future searches.

In times of heavy use, when deletions must be done rapidly and no time is available for decontamination, the record is simply marked as "deleted" and left in place. Later non-contaminating probes in the vicinity of such deleted record locations automatically remove the contaminating deleted records by moving records in the chain as described above.

This hybrid hashing technique has the decided advantage of automatically eliminating contamination caused by the fast-secure deletion procedure when the slower, non-contaminating deletion is used when the load on the system is at lower levels.

BRIEF DESCRIPTION OF THE DRAWING

A complete understanding of the present invention may be gained by considering the following detailed description in conjunction with the accompanying drawing, in which: 1

FIGS. 6A and 6B, when arranged as shown in FIG. 6, show a general flow chart for a slow noncontaminating record deletion operation which might be used in the hybrid hashing technique in accordance with the present invention;

FIG. 7 shows a general flow chart for a fast record deletion operation which may cause contamination of a hashed storage system and which might be used in a hybrid hashing system in accordance with the present invention.

To facilitate reader understanding, identical reference numerals are used to designate elements common to the figures.

DETAILED DESCRIPTION

Figure 1:
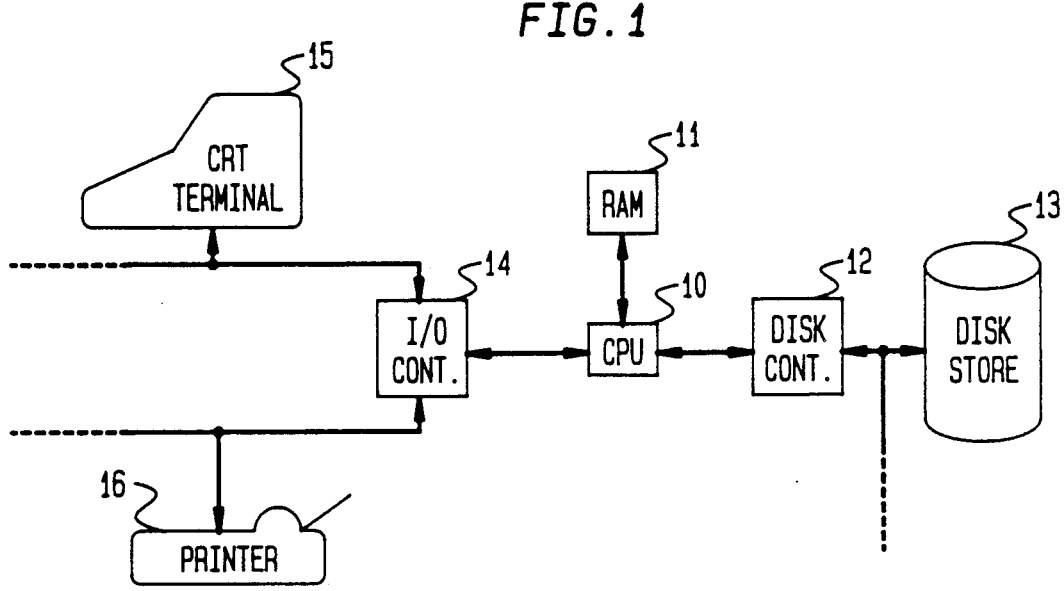
FIG. 1 shows a general block diagram of a computer system hardware arrangement in which the information storage and retrieval system of the present invention might be implemented.

Referring more particularly to FIG. 1 of the drawings, there is shown a general block diagram of a computer hardware system comprising a Central Processing Unit (CPU) 10 and a Random Access Memory (RAM) unit 11. Computer programs stored in the RAM 11 are accessed by CPU 10 and executed, one instruction at a time, by CPU 10. Data, stored in other portions of RAM 11, are operated upon by the program instructions accessed by CPU 10 from RAM 11, all in accordance with well-known data processing techniques.

Central Processing Unit (CPU) 10 also controls and accesses a disk controller unit 12 which, in turn, accesses digital data stored on one or more disk storage units such as disk storage unit 13. In normal operation, programs and data are stored on disk storage unit 13 until required by CPU 10. At this time, such programs and data are retrieved from disk storage unit 13 in blocks and stored in RAM 11 for rapid access.

Central Processing Unit (CPU) 10 also controls an Input-Output (IO) controller 14 which, in turn, provides access to a plurality of input devices such as CRT (cathode ray tube) terminal 15, as well as a plurality of output devices such as printer 16. Terminal 15 provides a mechanism for a computer operator to introduce instructions and commands int o the computer system of FIG. 1, and may be supplemented with other input devices such as card and tape readers, remotely located terminals, optical readers and other types of input devices. Similarly, printer 16 provides a mechanism for displaying the results of the operation of the computer system of FIG. 1 for the computer user. Printer 16 may similarly be supplemented by line printers, cathode ray tube displays, phototypesetters, graphical plotters and other types of output devices.

The constituents of the computer system of FIG. 1 and their cooperative operation are well-known in the art and are typical of all computer systems, from small personal computers to large main frame systems. The architecture and operation of such systems are well-known and, since they form no part of the present invention, will not be further described here.

Figure 2:
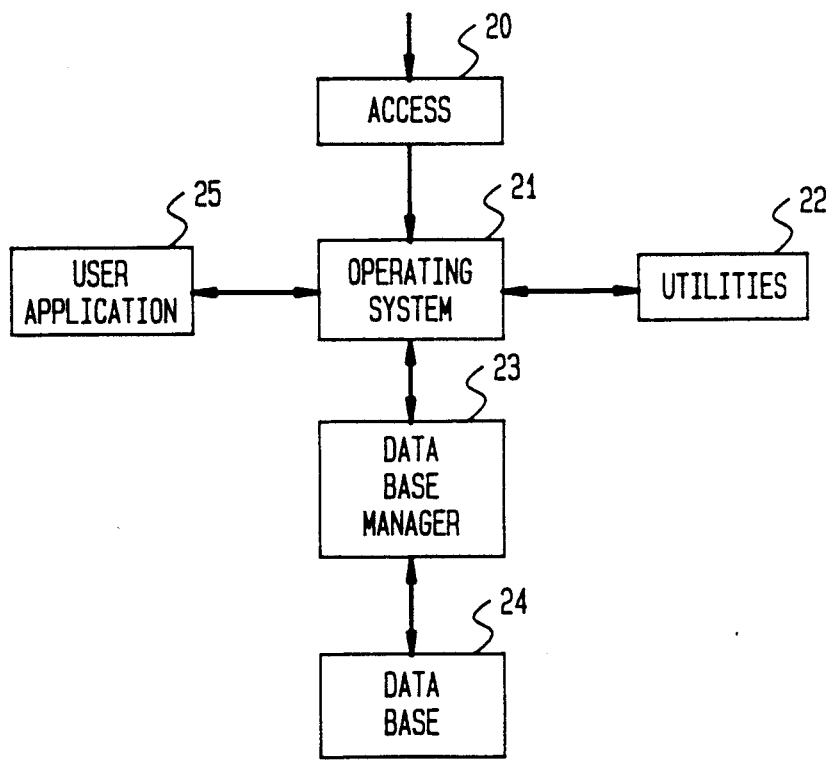
FIG. 2 shows a general block diagram of a computer system software arrangement in which the information storage and retrieval system of the present invention might find use.

In FIG. 2 there is shown a graphical representation of a typical software architecture for a computer system such as that shown in FIG. 1. The software of FIG. 2 comprises an access mechanism 20 which, for simple personal computers, may comprise no more than turning the system on. In larger systems, providing service to a larger number of users, login and password procedures would typically be implemented in access mechanism 20. Once access mechanism 20 has completed the login procedure, the user is placed in the operating system environment 21. Operating system 21 coordinates the activities of all of the hardware components of the computer system (shown in FIG. 1) and provides a number of utility programs 22 of general use to the computer user. Utilities 22 might, for example, comprise assemblers and compilers, mathematical routines, basic file handling routines and system maintenance facilities.

Many computer software systems also include a data base manager program 23 which controls access to the data records in a data base 24. Data base 24 may, for example, reside on a disk storage unit or units such as disk storage unit 13 of FIG. 1. User application programs such as application program 25 then use the data base manager program 23 to access data base records in data base 24 for adding, deleting and modifying data records. It is the efficient realization of a data base manager such as data base manager program 23 in FIG. 2 to which the present invention is directed.

Before proceeding to a description of one embodiment of the present invention, it is first useful to discuss hashing techniques in general. Hashing techniques have been used classically for very fast access to static, short term data such as a compiler symbol table. Typically, in such storage tables, deletions are infrequent and the need for the storage table disappears quickly. A badly hashed table therefore has only a very short lifetime.

If it is desired to take advantage of the fast access provided by hashing in long term dynamic data, problems arise. Frequent deletions from the storage table, usually implemented by marking the record location as "deleted," cause a serious deterioration of performance because of what has been called deleted entry "contamination." Contamination arises because of the ever-increasing need to search longer and longer chains of record locations to reach a desired location.

More particularly, a hash table can be described as a logically contiguous, circular list of consecutively numbered, fixed-sized storage units, called cells, each capable of storing a single item called a record. Each record contains a distinguishing field, called the key, which is used as the basis for storing and retrieving the associated record. The keys throughout the hash table data base are distinct and unique for each record. Hashing functions are usually not one-to-one in that they map many distinct keys to the same location.

The advantage of fewer search probes inherent in hashed storage is particularly important when the data is stored on a relatively slow storage medium (slower than the random access memory, RAM 11 of FIG. 1, available in internal computer memory). When such a hash table data base is stored on a slower external storage device such as disk store 13 of FIG. 1, the hash table is best organized as a consecutively numbered circular sequence of larger, multi-cell, fixed-sized storage units, each of which is termed a bucket. A bucket is the largest physically efficient input/output unit of the storage mechanism, such as a disk track in a disk storage unit. Each bucket consists of a sequence of consecutively numbered cells. The hashing function operates on the search key to translate or map the search key into a bucket number or address. Then the entire bucket is retrieved in a single access or probe, and the entire bucket may be processed at RAM speed.

It is to be understood that the present invention will be described in connection with a disk storage system only for convenience and because such disk storage mechanisms are more commonly used for data base storage than other form of storage. The techniques of the present invention can just as readily be applied to such other forms of storage systems by modifications readily apparent to those skilled in the art.

In accordance with well-known hash storage techniques, all storage cells have a "status" field which can be marked as "empty," "occupied" or "deleted." One of the uses of the status of the cell is to terminate searches. For example, a search for a cell containing a particular key fails when an empty cell is reached, but not when a deleted cell is reached. Insertions can be made in either empty or deleted cells. All cells are marked as empty initially, and cells are filled beginning at the front of the bucket and continuing sequentially through all the cells of the bucket. As a result, the empty cells in a bucket are always at the end of the bucket.

Figure 3:
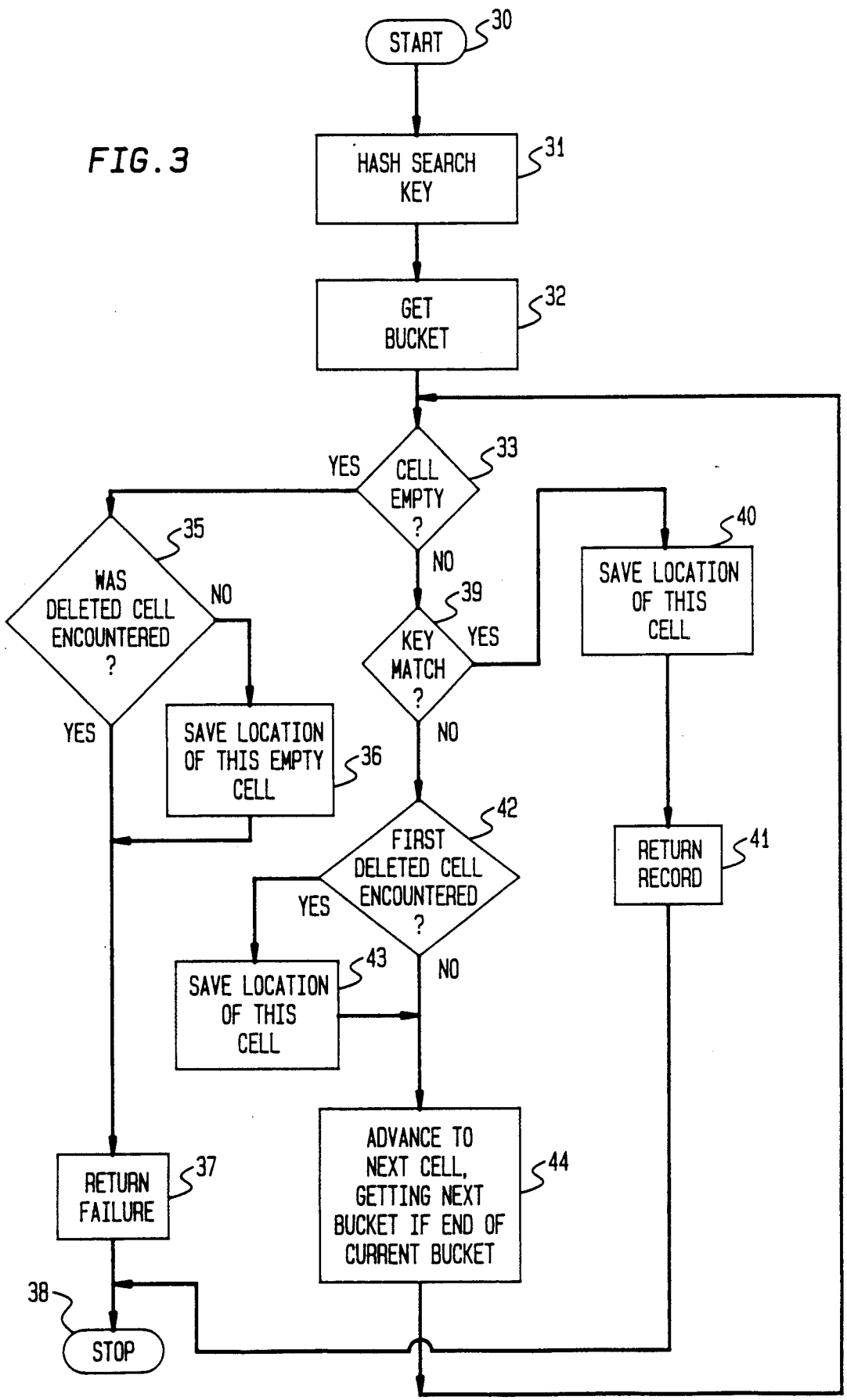
FIG. 3 shows a general flow chart for record retrieve operations which might be used in a hashed storage system using hybrid deletion techniques in accordance with the present invention.

In FIG. 3 there is shown a flow chart of a procedure for the retrieval of a record from the storage system. Starting in box 30 of the retrieve procedure, the search key of the record to be retrieved is hashed in box 31 to provide the address of a bucket. In box 32, that bucket is retrieved in its entirety and stored in internal computer memory. Decision box 33 examines the first cell of that bucket to determine if the cell is empty or not. If the cell tested in decision box 42 is empty, the decision box 35 is entered to determine if a deleted cell was encountered before the empty cell was encountered. If no deleted cell was encountered, box 36 is entered to save the location of the empty cell, since this is the first empty cell in the bucket and hence can be used to store a new record. If any deleted cells were encountered prior to the empty cell, the location of the first deleted cell would have already been saved, as will be described hereinafter. It should be recalled that a deleted cell can also be used to store a new record. In either event, the search for the record to be retrieved has failed, and box 37 is entered to return the failure indication to the calling process and to terminate the retrieve routine in terminal box 38.

If the cell is not empty, as determined by decision box 33, the search key and the stored key of the record in that cell are compared in decision box 39. If the keys match, the sought after record has been found and the location of this cell is saved in box 40, the record returned to the calling process in box 41 and the process terminated in box 38. If the keys do not match, decision box 42 is entered. In decision box 42 it is determined if this cell is marked as deleted and, if so, if this is the first deleted cell encountered in the search. If it is the first deleted cell, box 43 is entered to save the location of this deleted cell for use in storing a new record, if desired, as described above. If this cell is not the first deleted cell encountered, box 44 is entered to get the next cell in the bucket or, if at the last cell in the bucket, to get the first cell in the next succeeding bucket. In either event, this cell is the "next" cell in the sequence of cells to be considered. Decision box 33 is then reentered with this new cell contents. It can be seen that boxes 33, 39 and 44 operate to search for a cell with a matching key by linear probing with open addressing. Eventually either an empty cell is reached indicating a failed search, or the desired record if found and returned to the calling process.

The retrieve procedure illustrated generally in FIG. 3 is implemented in the Appendix as PASCAL-like pseudocode. Source code suitable for compilation and execution on any standard hardware and software computing system can readily be devised from this pseudocode and the flowcharts of the figures by any person of ordinary skill in the art.

Figure 4:
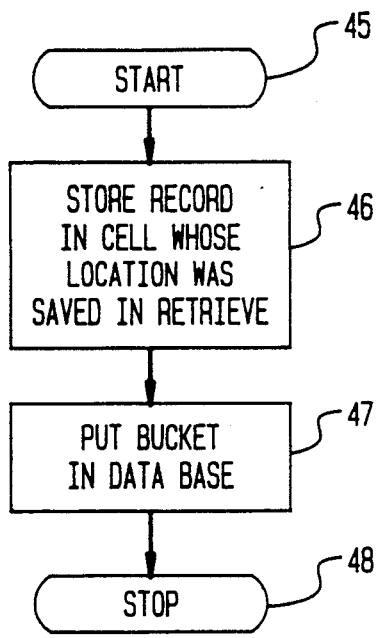
FIG. 4 shows a general flow chart for record insertion operations which might be used in a hashed storage system using hybrid deletion techniques in accordance with the present invention.

As shown in the flow chart of FIG. 4, in order to insert or store a record, starting at start box 45, it is assumed that the retrieve procedure of FIG. 3 has already been invoked to see if a record with this key has already been stored in the data base. If not, the retrieve procedure of FIG. 3 returns a failure indication along with the location of the first empty or first deleted cell encountered in its search for the record. In the insert procedure of FIG. 4, it is therefore only necessary to store the new record in the location provided by the retrieve procedure in box 46, return the accessed bucket to the data base in box 47 and terminate the insert procedure in box 48.

The insert procedure illustrated generally in FIG. 4 is implemented in the Appendix as PASCAL-like pseudocode. Source code suitable for compilation and execution on any standard hardware and software computing system can readily be devised from this pseudocode and the flowcharts of the FIG. 4 by any person of ordinary skill in the art.

Figure 5:
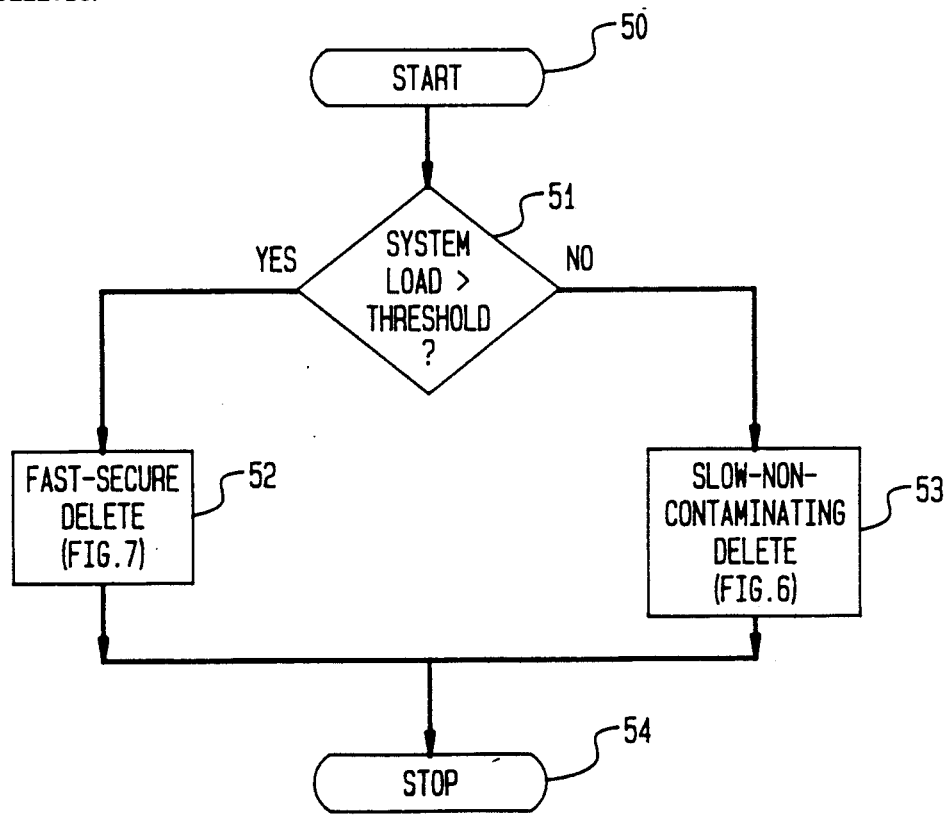
FIG. 5 shows a general flow chart for a hybrid deletion system for use in a hybrid hashing system in accordance with the present invention.

In FIG. 5 there is shown a general flowchart of the deletion procedure for the hybrid hashing system of the present invention. The hybrid hashing system requires the generation of some indication of the load on the data processing system. Counting the number of access to the hash table per unit time will accomplish this result. The load may, however, be caused by other processes sharing the computer system and unrelated to the data base system. Other, more complicated, indications of load may also be devised by those skilled in the art. In any event, a signal representing this load indicator is available for FIG. 5.

Returning to FIG. 5, the deletion procedure is started in terminal box 50. In decision box 51 it is determined whether the load, measured as described above, exceeds some preselected threshold. The threshold is, of course, chosen to cause a slow, non-contaminating deletion to be used below the threshold, but require fast, secure (but possibly contaminating) deletion above that threshold. If the load exceeds the threshold, box 52 is entered where fast, secure, but contaminating deletion takes place, as will be described in connection with FIG. 7. If, on the other hand, the load is less than the preselected threshold, then box 53 is entered where slow, non-contaminating deletion takes place, as described in connection with FIG. 6. As will be hereinafter described, the slow, box 68 of the non-contaminating deletion procedure of FIG. 5 also serves to automatically remove the contamination produced by box 52, without incurring any additional input-output operations. In accordance with the present invention, such automatic decontamination of the data base by the deletion procedure of box 53 allows the hashing technique to be used on large, heavily loaded, long lived data bases which heretofore could not avail themselves of the hashing technique due to the contamination problem. The hybrid deletion of FIG. 5 terminates in terminal 54.

Figure 6B:
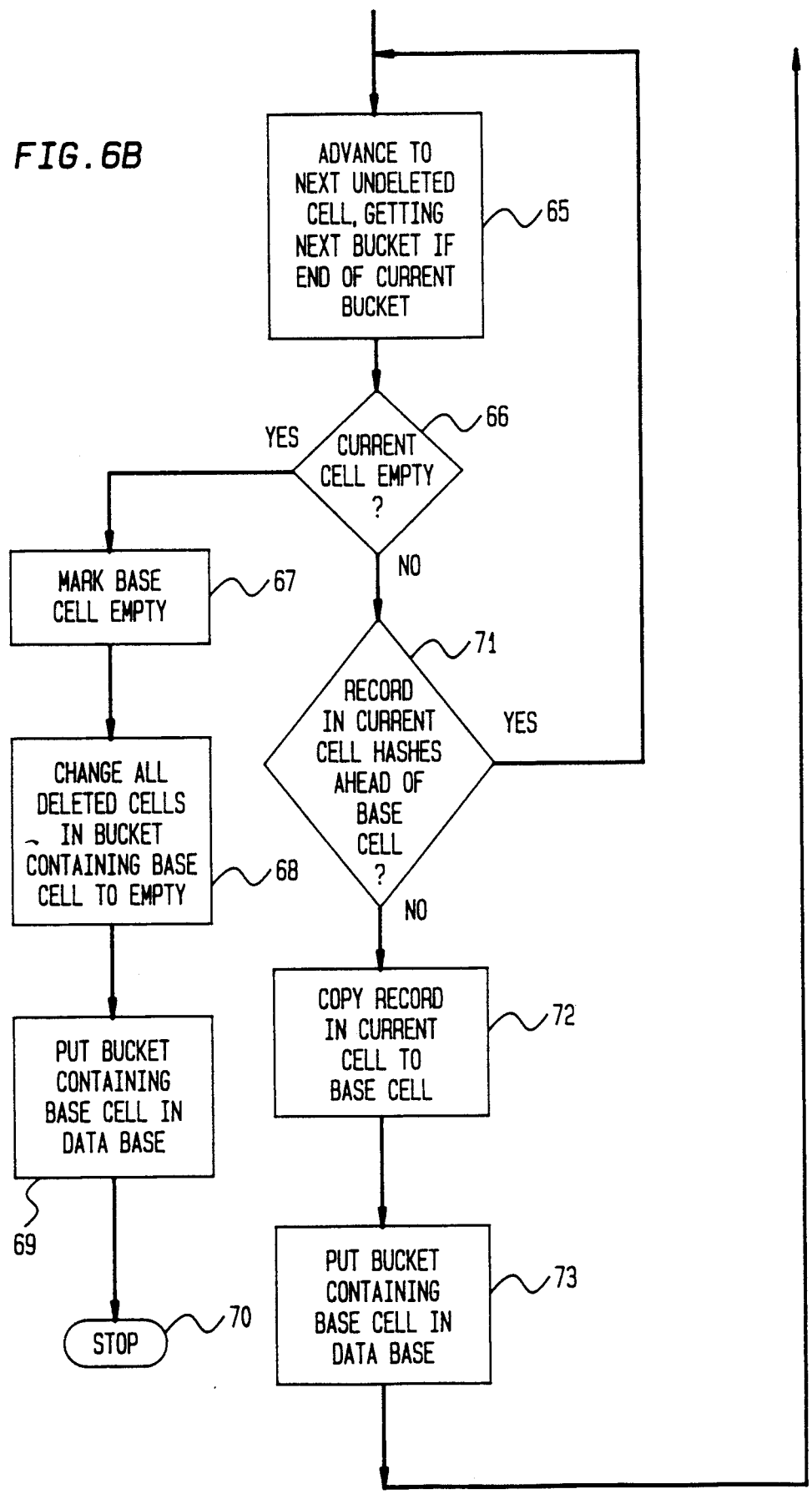

In FIG. 6 there is shown a flowchart of a slow non-contaminating delete procedure which is a version of the Knuth delete procedure noted above, but modified in accordance with the present invention. In FIG. 6, the slow noncontaminating delete procedure starts at box 60 and enters box 61. It is assumed that the retrieve procedure of FIG. 3 has been previously called and that the address of the cell to be deleted, along with the entire contents of the bucket in which it is located, have been obtained. In box 62 this cell is made the base cell. In general, the procedure operates to locate the last cell of the chain in the current bucket, started by the base cell, and to move the contents of that last cell to the base cell. If this was the end of the chain, the cell whose contents have been moved is marked as empty. If this is the end of the bucket, the chain chain may well continue on into the next bucket, and hence an empty cell cannot be left in this position at the end of the bucket (which would terminate all future searches as failed). The balance of the procedure of FIG. 6 deals with this possibility.

In box 63, the algorithm moves to the last record of the chain, or to the last record in the bucket, whichever comes first. In decision box 64, this record is moved to the base cell and the vacated cell is substituted as the new base cell. In box 65, the procedure advances to the next undeleted (empty or occupied) cell, either in the same bucket or in the next bucket. In box 66 this cell is tested to determine if it is empty. If it is empty, then the end of the chain of locations has been reached. In that event, box 67 is entered where the base cell is marked as empty. In box 68, all of the deleted cells in the bucket containing the base cell are marked as empty. This is possible because the storage discipline requires that all cells in the bucket with higher addresses than an empty cell must also be empty. These cell may have been marked as deleted during an earlier fast secure delete procedure. It is the operation of box 68 which provides automatic self-decontamination of the storage space in the vicinity of (in the same bucket as) the slow noncontaminatinq delete procedure. In box 69, the bucket containing the base cell is returned to the data base and the procedure terminated in terminal box 70.

If the current cell is not empty, as determined by decision box 66, decision box 67 is entered to test whether the key stored in this cell, when hashed by the hashing function, produces an address which is ahead of the base address. An address is "ahead of" the base address if it is an address higher in the searching direction. If the key hashes to an address ahead of the base address, box 65 is re-entered to advance to the next undeleted cell and the search continued for an empty cell or for a cell whose key does not hash ahead of the base cell. If the key in the current cell does not hash ahead of the base cell, as determined in decision box 71, box 72 is entered to copy the record in the current cell to the base cell and, in box 73, returning the bucket with the base cell to the data base. Box 62 is then re-entered, substituting the current cell for the base cell and the procedure is continued. Boxes 62 through 73 are then traversed until an empty cell is found (indicating the end of the chain). The procedure of FIG. 6 serves to close the chain started at or before the cell to be deleted. In box 68, these deleted cell are then marked as empty, thereby removing all contamination from the current bucket.

The pseudo-code for the slow noncontaminating delete procedure of FIG. 6 is included in the Appendix. Executable code for all common hardware and system software arrangements can readily be devised by those skilled in the art from the flowchart and the pseudo-code.

In FIG. 7 there is shown a general flowchart of the fast secure delete procedure described generally in box 52 of FIG. 5. From terminal box 75, the flowchart of FIG. 7 proceeds to box 76 where the cell saved by the retrieve procedure is made the base cell. In box 77, the procedure advances past the base cell to the last record in the chain (last record that hashes at the same address) or the last record of the bucket, whichever comes first. In box 78, the record found in box 77 is copied to the base cell, the current cell is made the new base cell and decision box 79 is entered. In decision box 79, the last cell of the bucket is tested to see if it is empty. If it is empty, box 80 is entered and the base cell is marked as empty. if the last cell of the bucket is not empty, the base cell is marked as deleted in box 81. In either event, box 82 is entered to return the bucket to the data base and the procedure terminated in terminal box 83.

It will be noted that the fast secure delete procedure of FIG. 7 does not introduce contamination in the local bucket if the deletion can be resolved entirely in the first bucket retrieved. In box 80, the base cell is marked as empty instead of as deleted, thereby avoiding deleted cell contamination. If the base cell is marked as deleted in box 81, however, contamination has been introduced which is not removed until this bucket is revisited by the slow noncontaminating delete procedure of FIG. 6.

The fast secure delete procedure illustrated generally in FIG. 7 is implemented in the Appendix as PASCAL-like pseudocode. Source code suitable for compilation and execution on any standard hardware and software computing system can readily be devised from this pseudocode and the flowchart of FIG. 7 by any person of ordinary skill in the art.

Figure 8:
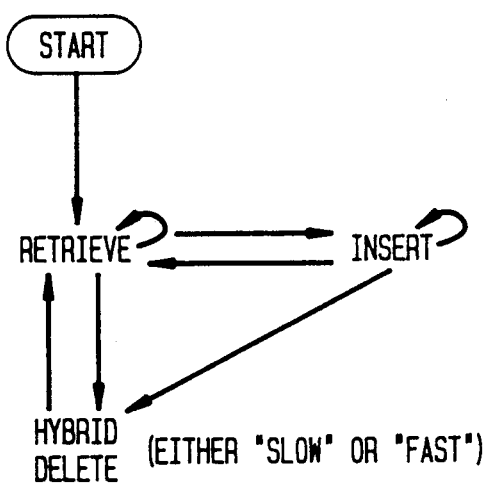
FIG. 8 shows a state diagram illustrating the permissible calling sequences for the operations illustrated in the flow charts of FIGS. 3, 4 and 5.

In FIG. 8 there is shown a state diagram illustrating the sequence in which the various procedures of FIGS. 3, 4 and 5 can be called. Starting at box 85, the retrieve procedure of FIG. 3 must be called first, before any other procedure. Thereafter, the insert procedure of FIG. 4, or the hybrid delete procedure of FIG. 5 can be called, or the retrieve procedure of FIG. 3 reinvoked. Either the retrieve procedure of FIG. 3 or the hybrid delete procedure of FIG. 5 can be called after the insert procedure, but only the retrieve procedure can be called following the hybrid delete procedure of FIG. 5. The circular arrows at the retrieve and insert procedures indicate that these procedures can be called repetitively without calling any other procedure.

It should also be clear to those skilled in the art that further embodiments of the present invention may be made by those skilled in the art without departing from the teachings of the present invention.

APPENDIX

Pseudo-Code Implementation

1. Introduction - Description of the Functions

The data base is considered entirely full when only one empty cell remains. The following functions assume that at least one empty cell exists. Therefore, the user calling program must keep track of the fullness of the data base.

retrieve (record: record type)

Returns success if a record associated with record.key was found in the data base and assigned to record. In addition, its location is saved in the common static variables should the record be replaced or deleted.

Returns failure if the search was unsuccessful. In addition, the common static variables are set to point to the data base cell where the record will be stored if insert is called later.

insert (record: record type)

Returns success if passed record was inserted into the data base, overwriting previous one with same key if it existed.

Returns error if sequence of function calls is improper or record.key does not match key passed to retrieve in most recent call.

slow noncontaminating delete

Returns success if record associated with the key last passed to retrieve was deleted using a non-contaminating deletion algorithm.

Returns error if sequence of function calls is improper.

fast secure delete

Returns success if record associated with the key last passed to retrieve was deleted using the fast technique.

Returns error if sequence of function calls is improper.

As noted in connection with FIG. 8, the retrieve function must be called before any of the other functions. In addition, record.key passed in record to insert must match the one passed to retrieve at the most recent call. .

The functions defined above can be used to implement the usual data base operations by calling retrieve prior to any of the other functions.

2. Formal Definitions

The following definitions are required for specifying the retrieval, insertion, and deletion algorithms. They are global to the functions shown in the next section. All variables are static.

```
const number of bkts    /* number of buckets
                           constituting the
                           data base */
const recs per bkt      /* number of data base
                           records per bucket */
type data base bucket:  array[0 .. recs per bkt-1]
     of record type;    /* bucket */
type cell location = record
     bucket no: 0 .. number of bkts - 1;
                        /* data base bucket number */
     bucket index: 0 .. recs per bkt - 1;
                        /* index of cell within bucket */
     bucket ptr: ↑ data base bucket;
                        /* pointer to buffer containing
                           a bucket */
     end;
var record key: record key type;
                        /* last record key retrieved */
var cell: cell location;
                        /* cell location of last record
                           retrieved */
var bucket1, bucket2: data base bucket;
                        /* buffers for buckets */
var write delete permitted: boolean;
                        /* used to enforce proper
                           sequencing of calls
                           (initially false) */
```

3. Pseudocode Functions

```
function retrieve (var record: record type):
     (success, failure);
/*  Search data base for record whose key matches
    record.key. If found, copy its contents
    into record, put its data base location
    in cell, put the contents of the containing
    bucket in cell.bucket ptr ↑, and return success.
    Otherwise place the location to which such a
    record can be assigned in cell, place the contents
    of the bucket in which that cell resides in
    cell.bucket ptr ↑, and return failure.
    Records within a bucket are unordered and therefore
    scanned sequentially. */
var i : cell location; /* used for scanning chain */
    delete found: boolean;
begin
    write delete permitted := false;
         /* made true on non-error return */
    record key := record.key;
    i.bucket no := hash(record key);
    i.bucket index := 0;
    i.bucket ptr := address(bucket1);
    delete found := false;
    read bucket i.bucket no from disk into bucket1;
    while (i.bucket ptr ↑ [i.bucket index] is not empty)
    and (i.bucket ptr ↑ [i.bucket index].key ≠
    record key) do
         begin
             if (i.bucket ptr ↑ [i.bucket index] is deleted)
             and (not delete found)
                 then begin
                     delete found := true;
                     cell := i
                 end;
             if (i.bucket index = recs per bkt — 1) or
                (i.bucket ptr ↑ [i.bucket index] is deleted)
                 then begin
                     i.bucket index := 0;
                     i.bucket no := (i.bucket no+1)
                          mod number of bkts;
                     if delete found then i.bucket ptr :=
                          address(bucket2);
                     read bucket i.bucket no from disk into
                          i.bucket ptr
                 end
                 else i.bucket index := i.bucket index + 1
         end;   /* while */
    write delete permitted := true;
         /* non-error return is imminent */
    if i.bucket ptr ↑ [i.bucket index] is empty
         then begin
             if not delete found then cell := i;
             return (failure)
         end
         else begin
             cell := i;
             record := i.bucket ptr ↑ [i.bucket index];
             return (success)
         end
end        /* retrieve */
function insert (record: record type): (success, error);
/*  Put record in cell.bucket ptr ↑ as indicated by
    cell.bucket index. Then write to the disk as
    indicated by cell.bucket no. */
begin
    if write delete permitted and (record.key =
         record key)
         then begin
             cell.bucket ptr ↑ [cell.bucket index] :=
                  record;
             write cell.bucket ptr ↑ to
                  bucket cell.bucket no on disk;
             return (success)
function slow noncontaminatinq delete: (success, error);
/*  Delete cell indicated by cell using noncontaminating
    algorithm */
var i, j: cell location;
         /* used for scanning cells */
    k : 0 .. number of bkts — 1;
         /* temporary variable for bucket number */
begin
    if not write delete permitted then return (error);
    write delete permitted := false;
         /* force retrieve to be next in sequence */
    i := cell;      /* initialize i */
    do forever
         j := i;     /* save position of deleted cell */
         if i.bucket index ≠ recs per bkt — 1
             then begin  /* move to end of chain, but not
                             beyond end of bucket;
                             delete that element instead */
```

```
            while (i.bucket ptr ↑ [i.bucket index + 1]
                is not empty)
            and (i.bucket ptr ↑ [i.bucket index + 1]
                is not deleted)
            and (i.bucket index < recs per bkt − 2) do
                i.bucket index := i.bucket index + 1;
            if (i.bucket ptr ↑ [i.bucket index + 1] is not
                empty) and (i.bucket ptr ↑ [i.bucket index + 1]
                is not deleted)
                then i.bucket index := recs per bkt − 1;
            if i.bucket index ≠ j.bucket index
                then begin
                        i.bucket ptr ↑ [j.bucket index] :=
                        i.bucket ptr ↑ [i.bucket index];
                        j.bucket index := i.bucket index
                    end
        end;        /* then */
        repeat      /* if bucket is full, scan forward
                        looking for a record to plug
                        hole in chain */
        repeat      /* advance i to next cell */
            if (i.bucket index = recs per bkt − 1) or
                (i.bucket ptr ↑ [i.bucket index] is deleted)
                then begin
                        i.bucket index := 0;
                        i.bucket no := (i.bucket no+1)
                            mod number of bkts;
                        if j.bucket ptr = address(bucket1)
                            then i.bucket ptr := address(bucket2)
                            else i.bucket ptr := address(bucket1);
                        read bucket i.bucket no from disk
                            into i.bucket ptr ↑
                    end
                else i.bucket index := i.bucket index + 1
        until i.bucket ptr ↑ [i.bucket index]
            is not deleted;
        if i.bucket ptr ↑ [i.bucket index] is empty
            then begin
                    j.bucket ptr ↑ [j.bucket index] := empty;
                    if j.bucket ptr ↑ [recs per bkt − 1]
                        is deleted
            /* this is where self-cleaning takes place */
                        then for j.bucket index :=
                            j.bucket index + 1 to recs per bkt − 1
                            do j.bucket ptr ↑ [j.bucket index[
                                := empty;
                    write j.bucket ptr ↑ to bucket j.bucket no
                        on disk;
                    return (success)
                end;
            k := hash(i.bucket ptr ↑ [i.bucket index].key)
        until (k < j.bucket no < i.bucket no) or
            (j.bucket no < i.bucket no < k) or
            (i.bucket no < k < j.bucket no);
        j.bucket ptr ↑ [j.bucket index] :=
        i.bucket ptr ↑ [i.bucket index];
            /* use cell i to plug hole in chain */
        write j.bucket ptr ↑ to bucket j.bucket no on disk
    end         /* do forever */
end         /* slow noncontaminating delete */
function fast secure delete: (success, error);
/*  Delete cell indicated by cell in one disk write
    operation. This operation does not do the usual cell
    garbage collection done by slow noncontaminating delete
    and, unlike slow noncontaminating delete, may assign a
    cell the status "deleted". fast secure delete and
    slow noncontaminating delete complement one another in
    that later use of slow noncontaminating delete in the
    vicinity of a cell with the "deleted" status may
    restore its status to "empty", which is more
    desirable. */
var i: 0 .. recs per bkt − 1;
        /* used for scanning cells */
begin
    if not write delete permitted then return (error)
    write delete permitted := false;
        /* force retrieve to be next in sequence */
    i := cell.bucket index;     /* initialize i */
    if i ≠ recs per bkt − 1
        then begin      /* move to end of chain,
                            but not beyond end of bucket;
                            delete that element instead *
        while (cell.bucket ptr ↑ [i + 1] is not empty)
            and (cell.bucket ptr ↑ [i + 1] is not deleted)
            and (i < recs per bkt − 2) do
                i := i + 1;
            if (cell.bucket ptr ↑ [i + 1] is not empty)
                and (cell.bucket ptr ↑ [i + 1] is not deleted)
                then i := recs per bkt − 1;
            if i ≠ cell.bucket index
                then cell.bucket ptr ↑ [cell.bucket index] :=
                    cell.bucket ptr ↑ [i]
        end;        /* then */
    if cell.bucket ptr ↑ recs per bkt − 1] is empty
        then cell.bucket ptr ↑ [i] := empty
        else cell.bucket ptr ↑ [i] := deleted;
            /* contamination is introduced here */
    write cell.bucket ptr ↑ to
        bucket cell.bucket no on disk;
    return (success)
end     /* fast secure delete */
```

What is claimed is:

1. An information storage and retrieval system using hashing techniques to provide rapid access to the records in the storage space of said system and utilizing a linear probing technique to store records with the same hash address, said system comprising load determining means for determining the load on said system a first record deletion means, automatically responsive to said load determining means indicating heavy loads on said system, for marking records to be deleted from said system as deleted but leaving said deleted records in place to provide a link to other records in said system, and a second record deletion means, automatically responsive to said load determining means indicating periods of lighter load on said system, for deleting records by moving another record with the same hash address, if any, into the portions of said storage space used for said deleted record, thereby to remove previously marked ones of said deleted records left in place during said heavy loads on said system.

2. The information storage and retrieval system according to claim 1 further including means for dividing said storage space into a plurality of equal-sized buckets of cells, each cell suitable for storing one record in said system.

3. The information storage and retrieval system according to claim 2 wherein said bucket size corresponds to a subsection of said storage space retrievable as a single block.

4. A method for information storage and retrieval using hashing techniques to provide rapid access to stored records in a preassigned storage space and utilizing linear probing to store records with the same hash address, said method comprising the steps of counting the number of accesses to said storage space per unit of time automatically utilizing a first record deletion means when the access count per unit time exceeds a preselected threshold, for marking records to be deleted from said system as deleted but leaving said deleted records in place to provide a link to other records in said system, and automatically utilizing a second record deletion means when the access count per unit time is less than said preselected threshold, for moving a record having the same hash address, if any, into the portion of said storage space used for said deleted record thereby not only to prevent further creation of deleted but unremoved records but also to remove records previously marked as deleted during said heavy loads on said system.

5. The method according to claim 4 further including the step of
dividing said storage space into a plurality of equal-sized buckets of cells, each cell suitable for storing one storage record.

6. The method according to claim 5 wherein said bucket size corresponds to a subsection of said storage space retrievable as a single block.

* * * * *

UNITED STATES PATENT AND TRADEMARK OFFICE
CERTIFICATE OF CORRECTION

PATENT NO. : 4,996,663

DATED : February 26, 1991

INVENTOR(S) : Richard M. Nemes

It is certified that error appears in the above-identified patent and that said Letters Patent is hereby corrected as shown below:

```
Column 1, line 48 before "of" insert --considered to be circular so that
     addresses beyond the end--.
Column 2, line 52 after "which:" delete --1--.
Column 3, line 46 "int o" should read --into--.
Column 6, line 32 "access" should read --accesses--.
Column 11, line 38 "index[" should read --index]--;
         line 69 "instead*" should read --instead*/--.
```

Signed and Sealed this

Third Day of May, 1994

Attest:

BRUCE LEHMAN

Attesting Officer

Commissioner of Patents and Trademarks